June 12, 1945.  D. I. HOOD  2,378,082
DIFFERENTIAL STEERING MECHANISM
Filed July 21, 1943  2 Sheets-Sheet 1

Inventor
Dayton I. Hood
By
Attorney

June 12, 1945.  D. I. HOOD  2,378,082
DIFFERENTIAL STEERING MECHANISM
Filed July 21, 1943  2 Sheets-Sheet 2
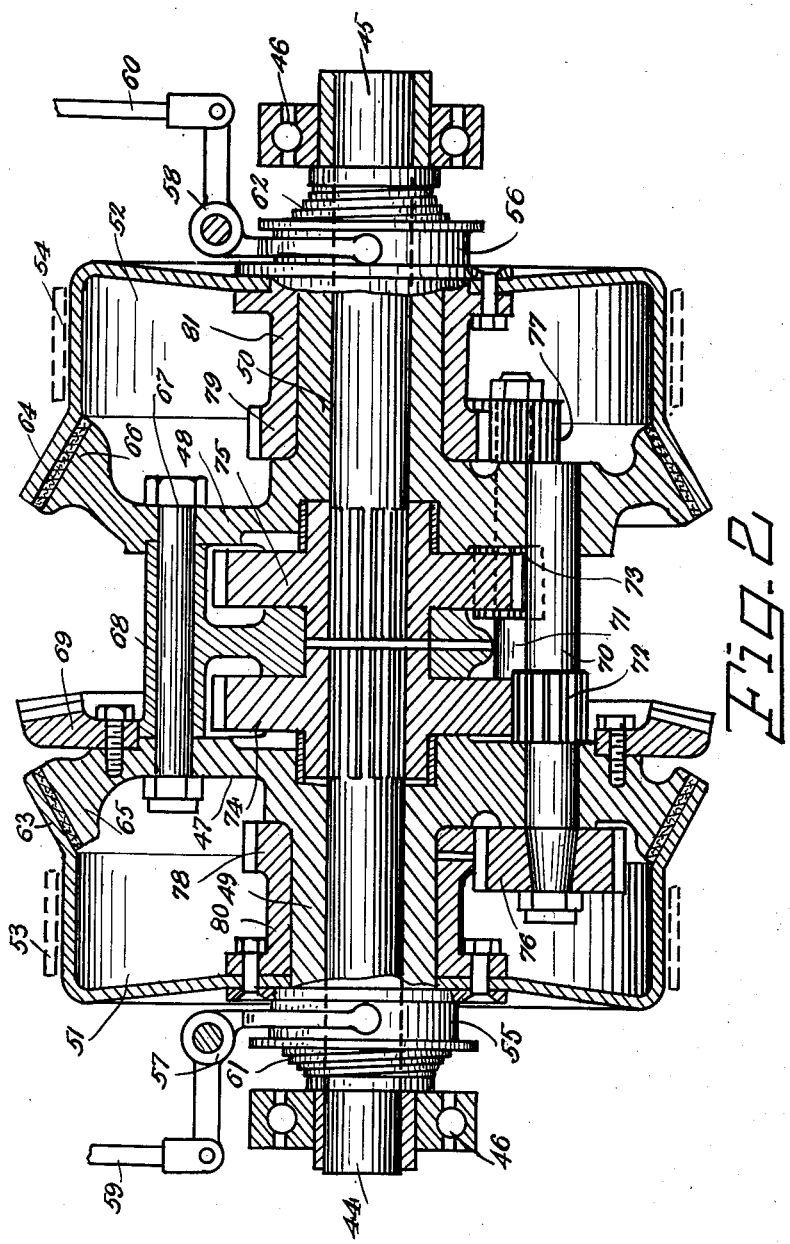
Fig. 2
Inventor
Dayton I. Hood
By
Attorney Patented June 12, 1945

2,378,082

UNITED STATES PATENT OFFICE 2,378,082

DIFFERENTIAL STEERING MECHANISM

Dayton I. Hood, Spokane, Wash.

Application July 21, 1943, Serial No. 495,633

1 Claim. (Cl. 180—9.2)

This invention relates to a differential steering mechanism and it is one object of the invention to provide a mechanism of such construction that tracks at opposite sides of a tractor may be driven at the same speed or one slower than the other and thus permit a tractor to be turned in a short space or driven forwardly along a side of a hill in a straight path.

Another object of the invention is to provide a steering mechanism wherein right and left hand drums will be normally left free to turn but may be held so that the shafts with which the drums are associated may be selectively held against turning and one shaft turn slowly while the other turns at its normal rate of speed.

Another object of the invention is to provide a differential steering mechanism which is controlled by right and left hand brakes, the brakes being normally out of gripping engagement with drums about which their bands fit, so that drive shafts of the differential normally rotate at the same speed, application of a selected brake causing the drive shaft associated with a gripped brake drum to be retarded and turn at reduced speed.

Another object of the invention is to provide a differential steering mechanism which is compact in construction, easy to operate and not liable to get out of order and fail to function properly.

The invention is illustrated in the accompanying drawings, wherein:

Figure 2 is a similar view of a modified form of steering mechanism.

Figure 1:
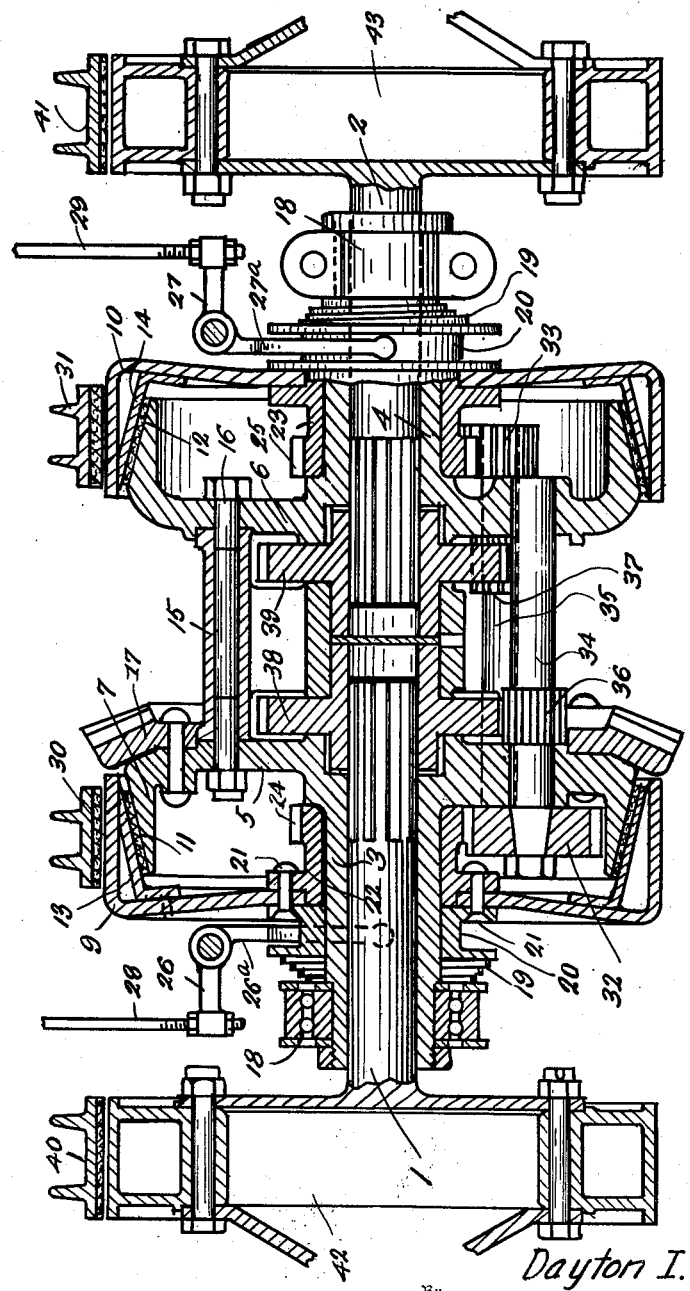
Figure 1 is a sectional view taken longitudinally through a differential steering mechanism of the improved construction.

The differential steering mechanism constituting the subject matter of the present invention is particularly adapted for use upon a tractor having traction tracks or endless treads at opposite sides thereof. The drive shafts 1 and 2 for the traction tracks or treads are rotatably mounted in end to end relation to each other and pass through the tubular shanks 3 and 4 of circular discs or clutch plates 5 and 6. These plates or discs have externally beveled flanges or rims 7 and 8 which fit within drums 9 and 10 and carry clutch bands 11 and 12 for gripping engagement with the circular liners 13 and 14 of the drums. A suitable number of sleeves or tubes 15 which are spaced from each other circumferentially of the plate, extend between said plates to hold them spaced from each other and through these tubes pass bolts 16. The plates will thus be firmly held in spaced relation to each other and caused to turn as a unit when rotary motion is imparted to the plate 5 from a power shaft having a gear meshing with a ring gear 17 carried by the plate 5. The shanks 3 and 4 are rotatably mounted through bearings 18 and about the shanks are springs 19 which bear against the bearings and engage collars 20 which are secured by rivets 21 to the drums 9 and 10 and to sleeves 22 and 23 carrying gears 24 and 25 at their inner ends. The springs yieldably hold the drums in their normal position for gripping engagement with the flanges 7 and 8 of the clutch plates 5 and 6 and, in order that the drums may be shifted away from the clutch plates, there have been provided bell crank levers 26 and 27 having forked arms 26a and 27a engaged in grooves of the collars 20. Rods 28 and 29 extend to suitable operating mechanism in reach of the driver of the tractor and by selectively operating the said mechanisms, the rods may be shifted longitudinally and turn the bell crank levers to shift the drums to releasing position. Brake bands 30 and 31 are associated with the drums to hold them against rotation when shifted to releasing position. The gears 24 and 25 mesh with companion gears 32 and 33 carried by shafts 34 and 35 which are rotatably mounted through bearings in the clutch plates 5 and 6, and it will be understood that each gear 24 and 25 meshes with a suitable number of gears 32 or 33 spaced from each other circumferentially of the gear about which they are disposed. The shafts 34 and 35 extend between the clutch plates and carry gears 36 and 37 meshing with gears 38 and 39 carried by the drive shafts 1 and 2, and it will be apparent that when the drums are in clutching engagement with the flanges of the clutch plates, the two shafts 1 and 2 will be turned at the same speed, whereas when the drum 9 is shifted away from the companion clutch plate 5 and held against turning, the gears 32 will travel about the gear 24 and shaft 1 turned at reduced speed. Therefore, the track at one side of the tractor may turn slower than the other. The same action takes place when the drum 10 is shifted away from the companion clutch plate 6 and shaft 2 will then turn at a slower speed than shaft 1. By applying the brakes 40 and 41 which are associated with brake drums 42 and 43 carried by the shafts 1 and 2, the tracks may be held stationary and the tractor turned upon a pivot.

In Figure 2 there has been illustrated a differential steering mechanism of modified construction. In this embodiment of the invention, the main drive shafts 44 and 45 are rotatably mounted in bearings 46 and carry clutch plates 47 and 48 having sleeves 49 and 50 through which the shafts pass. These sleeves carry drums 51 and 52 about which are disposed brake bands 53 and 54 and also carry grooved collars 55 and 56 engaged by forks of bell crank levers 57 and 58 so that when the levers are turned about their pivots by the rods 59 and 60 of operating mechanisms, the drums may be shifted away from the clutch plates in opposition to action of springs 61 and 62 disposed about the drive shafts between the collars and the bearings 46. The drums have flared flanges 63 and 64 disposed about the angularly disposed flanges or rims 65 and 66 of the clutch plates and normally grip the flanges of the clutch plates so that they turn together, but when a drum is shifted away from the companion clutch plate and held against turning by the cooperating brake band, the clutch plate will turn relative to the drum. A suitable number of bolts 67 pass through the clutch plates and through spacer sleeves 68 to cause the two clutch plates to turn as a unit when rotary motion is imparted to plate 47 from a power shaft having a gear meshing with the ring gear 69 carried by the clutch plate 47. Shafts 70 and 71 are rotatably mounted through the clutch plates and carry differential gears or pinions 72 and 73 meshing with gears 74 and 75 carried by the drive shafts 44 and 45. The shafts 70 and 71 also carry gears 76 and 77 meshing with gears 78 and 79 carried by sleeves 80 and 81 which fit loosely about the sleeves 49 and 50 to which the drums 51 and 52 are secured. When the drums are in gripping engagement with the companion clutch plates the two shafts 44 and 45 turn at the same speed, but when a drum is moved away from the companion clutch plate and held stationary by the companion brake band, the gears meshing with its sleeve will turn about the sleeve and the drive shaft with which this drum is associated will turn at reduced speed.

In each embodiment of the invention illustrated and described there have been provided drive shafts for right and left tracks or treads of a tractor and a differential mechanism associated with the drive shafts to normally cause them to rotate at the same speed. As long as the drums are in clutching engagement with the clutch plates, the speeds of the two shafts will be the same but when one drum is shifted away from the companion clutch plate and held stationary, the shaft about which the shifted drum is associated will be turned at reduced speed and since a brake band is provided about each drum, turning of the drum when shifted out of clutching engagement with the companion clutch plate, will be prevented.

Having thus described the invention, what is claimed is:

In a differential steering mechanism, alined drive shafts rotatably mounted, cup-shaped clutch plates having sleeves at their centers fitting loosely about said drive shafts, gears keyed to said shafts and located between said clutch plates, cup-shaped drums fitting about said clutch plates, sleeves at centers of said drums fitting loosely about said sleeves of the clutch plates and having gears at their inner ends, differential shafts extending between said clutch plates in parallel relation to the drive shafts and each other and disposed about the gears of the drive shafts and rotatably mounted through the clutch plates, pinions carried by said differential shafts outwardly of the clutch plates and meshing with companion gears of the clutch plates, other pinions carried by said differential shafts inwardly of the clutch plates and meshing with said companion gears of the drums, collars carried by said drums outwardly thereof and fitting loosely about the sleeves of said clutch plates, springs acting on said collars and urging said drums into gripping engagement with said clutch plates, levers engaging said collars for shifting said drums away from the clutch plates, and brakes for gripping said drums and preventing rotation of the drums and their gears when out of gripping engagement with the clutch plates.

DAYTON I. HOOD.